Patented Feb. 12, 1952

2,585,448

UNITED STATES PATENT OFFICE 2,585,448

PLASTICIZERS

William S. Emerson and Raymond I. Longley, Jr., Dayton, Ohio, assignors to Monsanto Chemical Company, St. Louis, Mo., a corporation of Delaware No Drawing. Application November 23, 1948, Serial No. 61,733

16 Claims. (Cl. 260—316)

This invention relates to compositions of matter having unusual utility in plasticizing resinous compositions, particularly polyvinyl chloride and copolymers of vinyl chloride with other polymerizable aliphatic monomers. More specifically the invention relates to mixtures of esters of glycols or thioglycols and both aliphatic and aromatic monocarboxylic acids.

Some of the esters of the polyethylene glycols have been used heretofore as plasticizers, but these have not been entirely satisfactory, either the cost of the plasticizer, or the physical properties of the plasticized compositions, or both, being unsuited for most uses. In copending application Serial No. 44,405, filed August 14, 1948, by William S. Emerson and Raymond I. Longley, Jr., there is described and claimed a class of plasticizing esters which are the aromatic esters of long chain glycols. They are quite useful as general purpose plasticizers but are not as flexible at low temperatures as is usually desired for year-round outdoor applications.

The fundamental purpose of this invention is to provide new low cost plasticizing compositions which have desirable properties at very low temperatures. A further purpose of this invention is to provide new and improved plastic compositions, particularly polyvinyl chloride and copolymers of vinyl chloride.

The new plasticizers are mixtures of esters made by esterifying glycols having the structural formula:

$$HO-(C_2H_4-X)_y-C_2H_4-OH$$

wherein X is an atom of the group consisting of sulphur and oxygen and $y$ is a small whole number from one (1) to three (3), inclusive, with a mixture of aliphatic and aromatic monocarboxylic acids. Suitable glycols are diethylene glycol, triethylene glycol, tetraethylene glycol, mixed polyethylene glycols, 3-thia-1,5 pentanediol, and 3,6-dithia-1,8 octanediol. Suitable aliphatic monocarboxylic acids are those of the saturated fatty acid series having from six to twelve carbon atoms, for example caproic, enanthylic, caprylic, pelargonic, capric, undecylic, and lauric acids. The aromatic monocarboxylic acids which are useful in the practice of this invention are benzoic acid and the alkyl substituted benzoic acids wherein the alkyl radical has from one to four carbon atoms and in which up to three alkyl substituents may be present, for example toluic acid.

The new plasticizing mixtures are prepared by conventional esterification procedures, for example by refluxing the glycols and the acids in stoichiometric proportions, or with a slight excess of the acids, using a reflux condenser adapted to separate the water evolved by the reaction. If desired, conventional esterification catalysts, such as sulfuric acid, benzenesulfonic acid, and p-toluenesulfonic acid may be used. The temperature of reflux may be adjusted by adding quantities of inert diluents, for example benzene, toluene, xylene and petroleum ether, which diluents also serve to carry off the water evolved by the esterification. In the practice of this invention the glycol and a mixture of at least one aliphatic monocarboxylic acid and at least one aromatic monocarboxylic acid are used, the total of the carboxylic acids being approximately the stoichiometrical equivalent of the glycol charged. Although any proportion of aromatic and aliphatic acids will produce a desirable result, the preferred practice involves using from 35 to 80 percent of the aromatic acid and from 20 to 65 percent of the aliphatic acid.

The value of the plasticizers may be estimated by means of three tests (1) compatibility (2) volatility and (3) Clash-Berg flex temperature. The compatibility is determined by visual inspection, clarity being a requisite in most applications for vinyl chloride polymers. The volatility is estimated by the test of heating at 105° C. for 24 hours and measuring the percentage of the plasticizer evaporated by loss of weight. The Clash-Berg flex temperature is determined by cooling the polymer sample to about −50° C. and observing the change in the modulus of rigidity as the sample warms up to room temperature, the flex temperature being that at which the modulus of rigidity is 135,000 pounds per square inch. Of these tests the compatibility is of primary importance while the others are only critical for certain applications. If the polymer is to be subjected to outside weather conditions flex temperatures of −20 to −30° C., or lower, are desirable. If the polymer is to be subjected to elevated temperatures a volatility less than 10 percent is advantageous. The volatilities and flex temperature of polymer plasticizer blends are difficult to predict and often have no apparent relationship to the physical constants of the plasticizer.

Further details of the practice of this invention are set forth with respect to the following specific examples.

Example 1

A distillation pot, topped with a distillation column and a reflux condenser adapted to separate the water from the water insoluble condensate, was charged with 53 parts by weight of diethylene glycol, 72 parts of caprylic acid, 80 parts of benzoic acid and 50 parts of toluene. This reaction mixture is seen to be substantially one mole of each of the reactants with a slight excess of acid being present. The mixture was refluxed for sixteen hours maintaining the pot temperature at 200 to 220° C. The residue was cooled, diluted with benzene, washed with dilute aqueous sodium carbonate and dried. The mixture so obtained was then distilled and the fraction boiling between 167 and 179° C., at 0.25 mm total pressure was collected.

This material was evaluated as a plasticizer by incorporating it to the extent of 40 parts by weight per hundred parts of polyvinyl chloride and the composition so prepared was subjected to the conventional volatility and Clash-Berg temperature tests described above. It was found that the composition had a flex temperature of —44° C. and a volatility of 7.7 percent. A sample of diethylene glycol dibenzoate was used as a control and subjected to the same tests, this sample having a flex temperature of —19° C. and a volatility of 2.4 percent.

The composition prepared in accordance with this example was a mixture of diethylene glycol dibenzoate, diethylene glycol dicaprylate, and the mixed diethylene glycol esters of benzoic and caprylic acids.

*Example 2*

Using the procedure described in the preceding example various glycols and various combinations of aromatic and aliphatic monocarboxylic acids were esterified and the resulting compositions tested in polyvinyl chloride compositions for both flex temperatures and volatility. The following table sets forth the resulting data:

| Compound | Flex Temp., °C. | Volatility |
|---|---|---|
|  |  | Per Cent |
| Diethylene Glycol Caprate-Toluate | —48 | 4.3 |
| Diethylene Glycol Laurate-Toluate | —41 | 1.3 |
| Diethylene Glycol Benzoate-Caprylate | —47 | 9.7 |
| Thiodiglycol Benzoate 2-Ethylhexoate | —42 | 4.9 |
| Thiodiglycol Benzoate Caprylate | —44 | 1.7 |

The invention is defined by the following claims.

We claim:

1. A plasticizer which comprises a mixture of esters made by esterifying a glycol having a structural formula:

$$HO-(C_2H_4-X)_y-C_2H_4-OH$$

wherein X is an atom of the group consisting of sulfur and oxygen and $y$ is a small whole number from one (1) to three (3), inclusive, with a mixture of 20 to 65 mole percent of at least one aliphatic saturated monocarboxylic acid having from six to twelve carbon atoms, and 80 to 35 mole percent of at least one aromatic monocarboxylic acid having the structure:

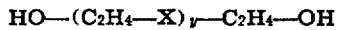

wherein R is a saturated alkyl radical having from one to four carbon atoms and $x$ is a whole number from zero (0) to three (3), inclusive.

2. A plasticizer which comprises a mixture of an ester having the structural formula:

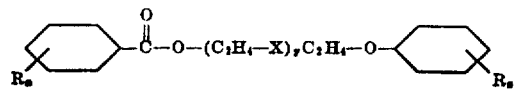

wherein X is an atom of the group consisting of sulfur and oxygen, $y$ is a small whole number from one to three, inclusive, R is a saturated alkyl radical having up to four carbon atoms, and $x$ is a small number from zero (0) to three (3), inclusive, an ester having the structural formula:

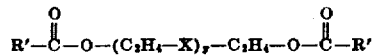

wherein X is an atom of the group consisting of sulfur and oxygen, $y$ is a small whole number from one (1) to three (3), inclusive, R' is a saturated hydrocarbon radical containing five to eleven carbon atoms, and an ester having the structural formula:

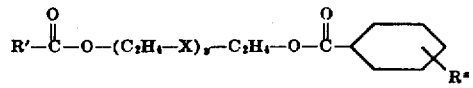

wherein X is an atom of the group consisting of sulfur and oxygen, $y$ is a small whole number from one (1) to three (3), inclusive, R is a saturated alkyl radical having up to four carbon atoms, R' is a saturated hydrocarbon radical containing five to eleven carbon atoms, and $x$ is a small whole number from zero (0) to three (3), inclusive, and wherein of the total modifying groups present from 35 to 80 mole percent are

and 65 to 20 mole percent are —R'.

3. A plasticizer which comprises a mixture of esters made by esterifying triethylene glycol with a mixture of 35 to 80 mole percent of benzoic acid and 20 to 65 mole percent of a saturated aliphatic acid having from six to twelve carbon atoms.

4. A plasticizer which comprises a mixture of triethylene glycol dibenzoate, triethylene glycol dicarboxylate and the mixed triethylene glycol benzoate carboxylate, said carboxylate saturated radicals having from six to twelve carbon atoms, wherein of the total ester groups present from 35 to 80 mole percent are benzoate and 65 to 20 mole percent are carboxylate.

5. A plasticizer which comprises a mixture of esters made by esterifying diethylene glycol with a mixture of 35 to 80 mole percent of toluic acid and 20 to 65 mole percent of a saturated aliphatic acid having from six to twelve carbon atoms.

6. A plasticizer which comprises a mixture of diethylene glycol ditoluate, diethylene glycol dicarboxylate and the mixed diethylene glycol toluate carboxylate, said carboxylate saturated radicals having from six to twelve carbon atoms, wherein of the total ester groups present from 35 to 80 mole percent are toluate and 65 to 20 mole percent are carboxylate.

7. A plasticizer which comprises a mixture of esters made by esterifying 3-thiapentane-1,5-diol with a mixture of 35 to 80 mole percent of benzoic acid and 20 to 65 mole percent of a saturated aliphatic acid having from six to twelve carbon atoms.

8. A plasticizer which comprises a mixture of the dibenzoate ester of 3-thiapentane-1,5-diol, the dicarboxylate ester of 3-thiapentane-1,5-diol, and the mixed benzoate carboxylate ester of 3-thiapentane-1,5-diol, the said carboxylate saturated radicals having from six to twelve carbon atoms, wherein of the total ester groups present from 35 to 80 mole percent are benzoate and 65 to 20 mole percent are carboxylate.

9. A plasticizer which comprises a mixture of esters made by esterifying 3-thiapentane-1,5-diol with a mixture of acids consisting of 35 to 80 mole percent of benzoic acid, and from 20 to 65 mole percent of 2-ethylhexoic acid.

10. A plasticizer which comprises a mixture of the dibenzoate ester of 3-thiapentane-1,5-diol, the di-2-ethylhexoate ester of 3-thiapentane-1,5-diol, and the mixed benzoate 2-ethylhexoate ester of 3-thiapentane-1,5-diol, wherein of the total ester groups present from 35 to 80 mole percent are benzoate and 65 to 20 mole percent are 2-ethylhexoate.

11. A plasticizer which comprises a mixture of esters made by esterifying diethylene glycol with a mixture of acids consisting of 35 to 80 mole percent of toluic acid, and from 20 to 65 mole percent of capric acid.

12. A plasticizer which comprises a mixture of diethylene glycol dicaprate, diethylene glycol ditoluate, and diethylene glycol caprate toluate, wherein of the total ester groups present from 35 to 80 mole percent are toluate and 65 to 20 mole percent are caprate.

13. A plasticizer which comprises a mixture of esters made by esterifying diethylene glycol with a mixture of acids consisting of 35 to 80 mole percent of benzoic acid, and from 20 to 65 mole percent of caprylic acid.

14. A plasticizer which comprises a mixture of diethylene glycol dicaprylate, triethylene glycol dibenzoate, and diethylene glycol caprylate benzoate, wherein of the total ester groups present from 35 to 80 mole percent are benzoate and 65 to 20 mole percent are caprylate.

15. A plasticizer which comprises a mixture of diethylene glycol dilaurate, diethylene glycol ditoluate, and diethylene glycol laurate-toluate, wherein of the total ester groups present from 35 to 80 mole percent are toluate and 65 to 20 mole percent are laurate.

16. A plasticizer which comprises a mixture of the dibenzoate ester of 3-thiapentane-1,5-diol, the dicaprylate ester of 3-thiapentane-1,5-diol, and the mixed benzoate caprylate ester of 3-thiapentane-1,5-diol, wherein of the total ester groups present from 35 to 80 mole percent are benzoate and 65 to 20 mole percent are caprylate.

WILLIAM S. EMERSON.
RAYMOND I. LONGLEY, Jr.

REFERENCES CITED

The following references are of record in the file of this patent:

UNITED STATES PATENTS

| Number | Name | Date |
| --- | --- | --- |
| 2,017,070 | Lazier | Oct. 15, 1935 |
| 2,306,315 | Lycan | Dec. 22, 1942 |
| 2,448,520 | Cupery | Sept. 7, 1948 |

Certificate of Correction

Patent No. 2,585,448                                           February 12, 1952

WILLIAM S. EMERSON ET AL.

It is hereby certified that error appears in the printed specification of the above numbered patent requiring correction as follows:

Column 3, line 74, for that part of the structural formula reading column 4, lines 18 to 20, for that part of the structural formula reading

 read 

column 6, line 1, for "triethylene" read *diethylene*;

and that the said Letters Patent should be read as corrected above, so that the same may conform to the record of the case in the Patent Office.

Signed and sealed this 13th day of May, A. D. 1952.

[SEAL]

THOMAS F. MURPHY,
                                         *Assistant Commissioner of Patents.*